United States Patent [19]

Steudler, Jr.

[11] Patent Number: 4,892,061

[45] Date of Patent: Jan. 9, 1990

[54] DRINKING SYSTEM FOR POULTRY, SMALL ANIMALS AND THE LIKE

[75] Inventor: Frederick W. Steudler, Jr., New Providence, Pa.

[73] Assignee: Val Products, Inc., Bird-in-Hand, Pa.

[21] Appl. No.: 162,540

[22] Filed: Mar. 1, 1988

[51] Int. Cl.⁴ ............................................ A01K 39/02
[52] U.S. Cl. ...................................... 119/75; 119/72.5
[58] Field of Search ............. 119/72, 72.5, 75, 97 AR, 119/63, 74; 248/59, 318, 340, 248

[56] References Cited

U.S. PATENT DOCUMENTS

| | | | |
|---|---|---|---|
| 1,037,054 | 8/1912 | Rose | 119/74 |
| 1,610,614 | 12/1926 | McCollough | 119/97 AR |
| 3,298,356 | 11/1967 | Sutton | 119/74 |
| 3,313,273 | 4/1967 | Mitchell | 119/72 |
| 3,983,844 | 10/1976 | Hart | 119/75 |
| 4,221,188 | 9/1980 | Hostetler | 119/72 |
| 4,516,533 | 5/1985 | Mallinson | 119/72 |
| 4,527,513 | 7/1985 | Hart et al. | 119/72 X |
| 4,669,422 | 6/1987 | Steudler, Jr. | 119/72 |
| 4,770,126 | 9/1988 | Hostetler | 119/72.5 X |

FOREIGN PATENT DOCUMENTS 468504 8/1937 United Kingdom .

Primary Examiner—Robert P. Swiatek
Assistant Examiner—Nicholas D. Lucchesi
Attorney, Agent, or Firm—Diller, Ramik & Wight

[57] ABSTRACT

A drinking mechanism which includes a trough, the trough having a generally upwardly opening mouth when in an in-use position, brackets for suspending the trough from a support structure in the in-use position, the trough being movable by the rotation of the brackets to a non-use position at which the mouth is no longer in the generally upwardly opening position but instead opens generally downwardly, and the bracket also holding the trough in its non-use position thereby preventing the interior of the trough from becoming filled with debris when associated with poultry or similar small animals. Preferably, the drinking mechanism is suspended by the brackets from a conventional watering system which includes a water pipe and a plurality of drinkers having nipples which can be actuated by the beaks of birds or similar animals. Through this combination, chicks having tender beaks which have just been de-beaked can drink from the trough and as the beaks heal and the chicks grow the trough can than be pivoted to its non-use position and the chicks or birds can then drink from the individual drinkers in a conventional fashion.

39 Claims, 3 Drawing Sheets

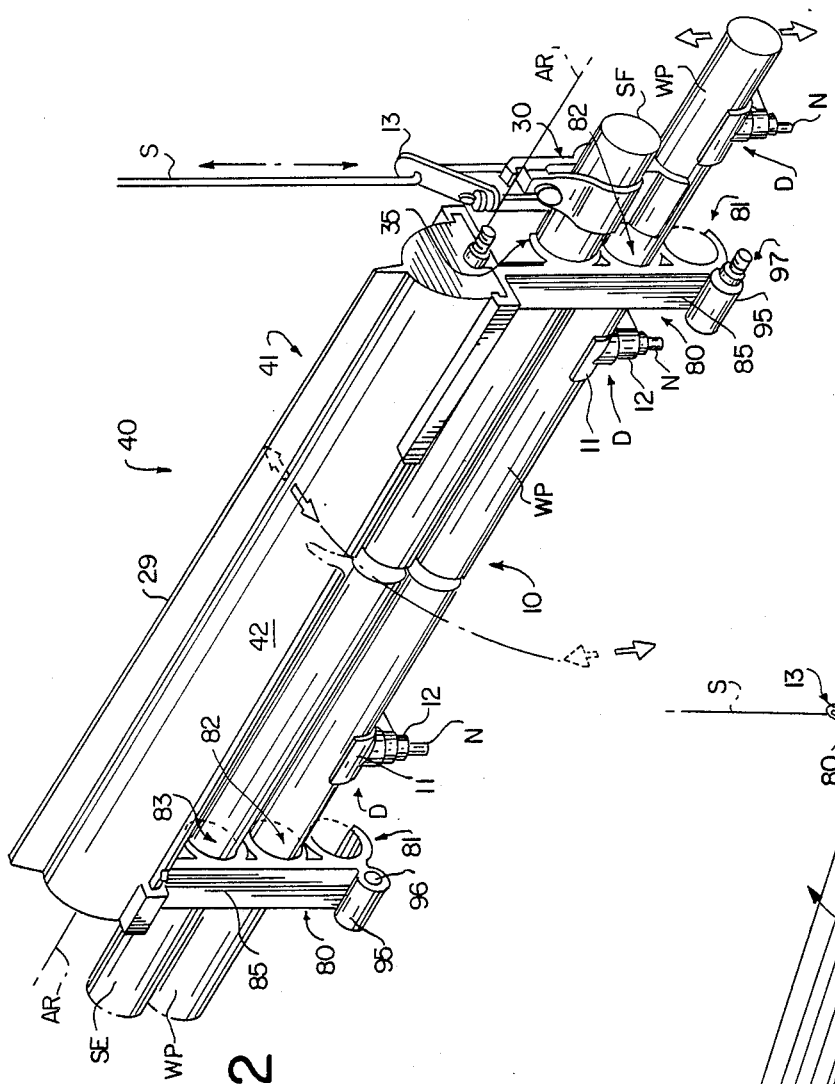
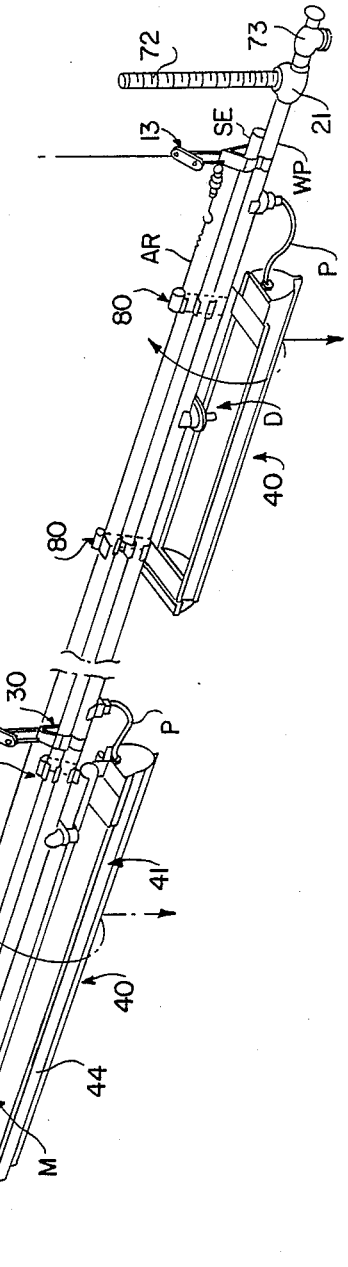
FIG. 2
FIG. 1

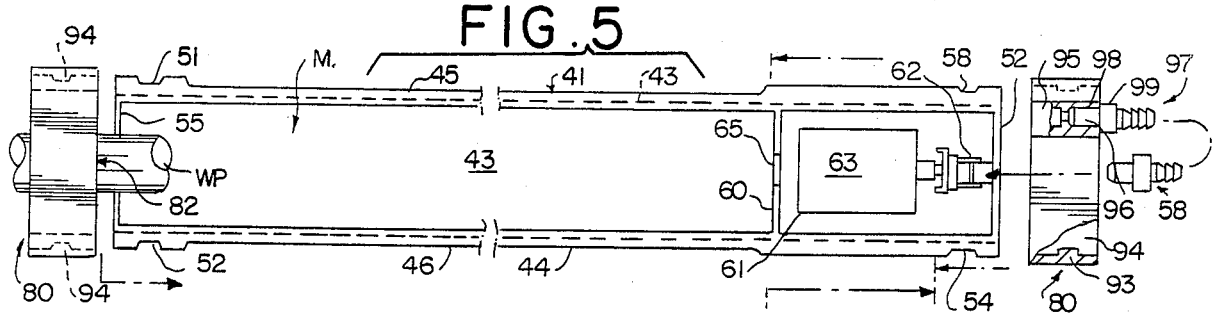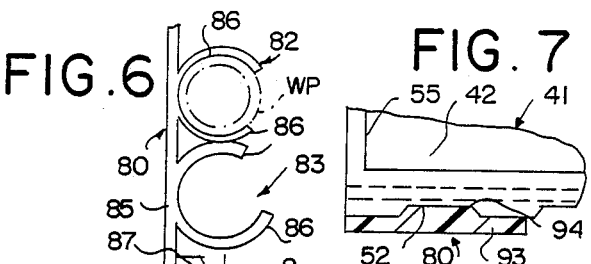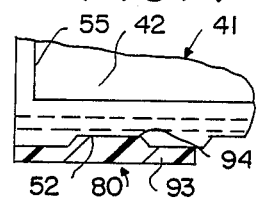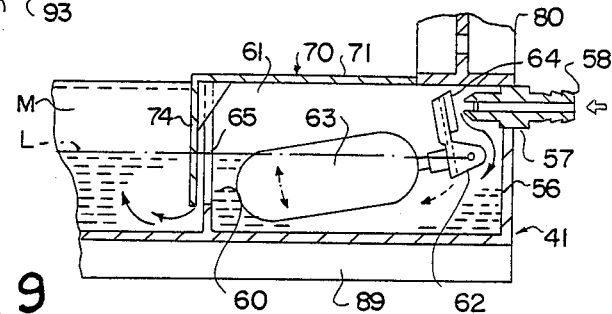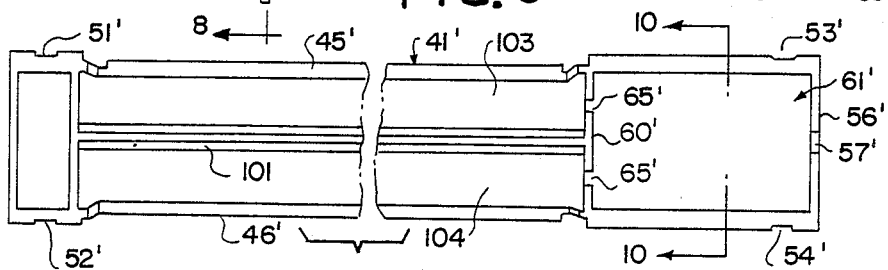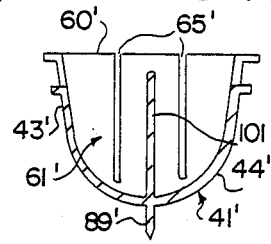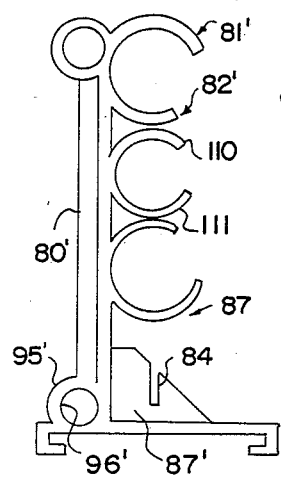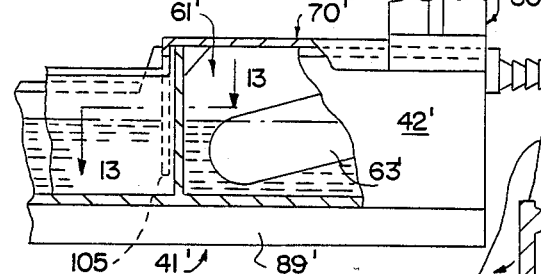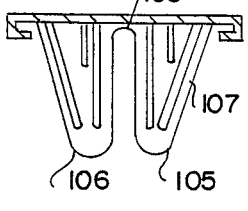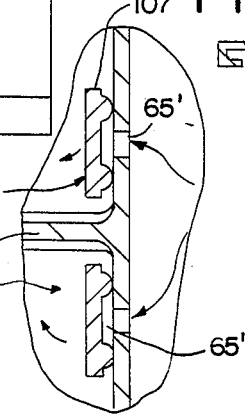

DRINKING SYSTEM FOR POULTRY, SMALL ANIMALS AND THE LIKE

BACKGROUND OF THE INVENTION

The present invention relates to an improvement in a conventional floor watering system for poultry, small animals and the like which includes a plurality of brackets which carry an anti-roosting element, a stabilizing element and a water pipe with a plurality of individual drinkers. This conventional floor watering system is adjustable in height to quickly reposition the water pipe and the associated individual drinkers as the animal/poultry grow. The drinkers are quite low to the "ground" for younger "chicks," but as the birds age, the watering system is progressively elevated. Thus, this conventional watering system allows birds to be fed as they grow, but does not take into consideration a problem involving de-beaked chicks.

The beaks of de-beaked chicks are very tender and, therefore, prevent de-beaked chicks from operating the nipples of conventional drinkers. This necessitates two separate water systems, namely, a trough system to water de-beaked chicks while their beaks are tender and the conventional height adjustment individual drinker system for older chicks and birds.

Heretofore it was necessary to first install/use a trough system in a poultry house to water de-beaked chicks, remove and/or elevate the trough system, and then install/lower a suspended individual drinker (nipple) system. The disadvantages of two totally independent drinking systems is apparent, including, of course, the necessity of utilizing two separate support or suspension systems and associated watering supplies and pressure regulators, not to mention the fact that the older birds can fly, roost on the un-used troughs of the trough systems, defecate therein, which, of course, requires subsequent cleaning and attendant down time, increased costs, and additional manpower.

SUMMARY OF THE INVENTION

In keeping with the foregoing, the present invention includes the components of a typical conventional suspended watering system, namely, an anti-roosting element, a stabilizing element and a water pipe having a plurality of individual drinkers. However, the drinking system further includes a plurality of troughs, each having a mouth disposed beneath and opening generally upwardly toward the watering pipe when the trough is in its in-use position which when placed low to the "ground" allows de-beaked chicks to drink water therefrom. These troughs are suspended in their in-use position by brackets from the water pipe and are placed in fluid communication therewith through a fitting connecting to one of the individual drinker housings.

Each of the brackets is so designed that the troughs can be rotated about the axis of the water pipe to bring the troughs to a non-use position in which the mouths open in a generally downward direction. In this non-use or inverted position of the troughs the interior trough chamber or liquid chamber can not be dirtied by defecation from roosting birds. Furthermore, in both the in-use and the non-use position, the brackets include clips and/or slots for locking the trough so that rotation is prevented and in the normal in-use position water will not be spilled therefrom. Due to the foregoing, a single watering system which is vertically adjustable can be used alternately as a trough system to feed de-beaked chicks or as an individual drinker/nipple system for older chicks and birds in the absence of a duplication of structure and with attendant advantages otherwise heretofore unprovided by known or conventional trough and individual drinker systems.

The thus briefly described watering system is an improvement over known conventional floor watering systems disclosed and claimed in, for example, patentee's assigned Pat. No. 4,669,422 granted June 2, 1987 and entitled HEIGHT ADJUSTABLE WATERING SYSTEMS FOR POULTRY, SMALL ANIMALS AND THE LIKE. The individual nipples associated with the Height Adjusting Watering System are described in, for example, the commonly assigned Pat. Nos. 4,610,221 and 4,660,509 of patentee granted respectively on Sept. 9, 1986 and Apr. 28, 1987. The contents of the latter-identified patents are incorporated herein by reference.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 1 is a perspective view of a novel poultry/small animal watering system of this invention, and illustrates a plurality of adjustable suspension cables connected to a plurality of brackets, each of which has secured thereto an anti-roosting element, a stabilizing element and a watering pipe with a plurality of individual drinkers; and a further pair of brackets supporting a trough from the watering pipe with a mouth of the trough opening generally upwardly in the in-use trough position.

FIG. 2 is an enlarged perspective view of the trough and brackets of FIG. 1, and illustrates the trough after having been rotated to its inverted non-use position with the mouth opening in a generally downward direction and the individual drinkers being accessible to poultry/small animals.

FIG. 5 is a top plan view of the trough and a float chamber thereof, and illustrates the brackets prior to being secured to the trough and a cover for the float chamber.

FIG. 6 is a cross-sectional view taken generally along line 6—6 of FIG. 3, and illustrates a depending baffle plate of the float chamber cover and a slot for receiving the anti-roosting element which locks and stabilizes the trough in its inverted non-use position.

FIG. 7 is an enlarged fragmentary view taken generally along line 7—7 of FIG. 3, and illustrates one of the opposite recesses and edges of the trough for receiving the locking projection of the associated suspension bracket.

FIG. 8 is an enlarged fragmentary sectional view of the lower right-end corner of FIG. 3, and illustrates a valve opened to admit water by the action of the float within the float chamber responsive to liquid level in the trough.

FIG. 9 is a top plan view of another trough, and illustrates a central divider along the longitudinal axis thereof.

FIG. 10 is a cross-sectional view taken generally along line 10—10 of FIG. 9, and illustrates the central divider and an associated float chamber end wall having a pair of slots, one to either side of the central divider.

FIG. 11 is an end view of a float chamber cover, and illustrates a bifurcated baffle plate thereof to accommodate the trough central divider.

FIG. 12 is a fragmentary view similar to FIG. 8, and illustrates the bifurcated baffle plate adjacent the float chamber end wall in opposition to the slots of the latter.

FIG. 13 is an enlarged fragmentary sectional view taken generally along the line 13—13 of FIG. 12, and illustrates in more detail the relationship of the bifurcated baffle plate and the slots of the float chamber end wall.

FIG. 14 is a side elevational view of another suspension bracket, and illustrates a relatively linear slot for receipt of the anti-roosting element when a trough associated with the suspension bracket is in its inverted non-use position.

FIGS. 3 and 4 is an enlarged fragmentary sectional view of a portion of the bracket of FIG. 14, and illustrates a locking clip for presenting accidental removal of the bracket from the water pipe.

DESCRIPTION OF THE PREFERRED EMBODIMENTS

Figure 3:
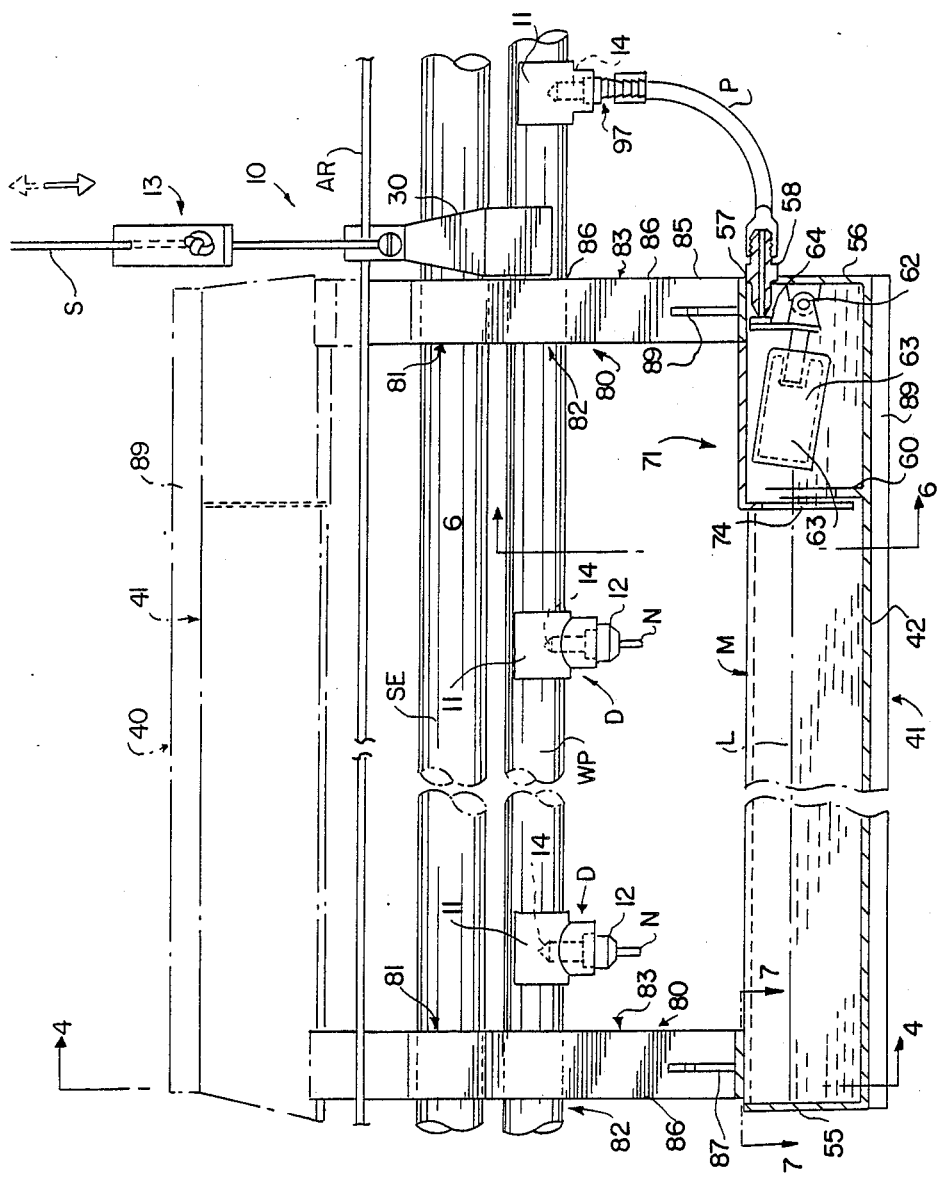
FIG. 3 is a fragmentary side elevational view with portions broken away for clarity of the drinking system of FIGS. 1 and 2, and illustrates the trough in its in-use position with water being conducted thereto from the water pipe of the conventional suspended watering system.

A conventional poultry/small animal or like floor watering system is shown in FIG. 1 of the drawings, is generally designated by reference number 10, and is disclosed in more detail in Pat. No. 4,669,422.

The conventional watering system 10 includes a flexible pipe 16 connected to such unillustrated elements as a water filter assembly, a valve and a water meter through a conventional water regulator 17 which controls the water pressure to a T-coupling 18 having an outlet (unnumbered) connected to a graduated vertical stand pipe 20 and another outlet (unnumbered) connected to a waterer or watering pipe WP. An opposite end (unnumbered) of the watering pipe WP is connected to another T-shaped coupling 21, to another graduated stand pipe 22 and a valved nozzle 23. The water pipe WP is formed of a plurality of lengths of plastic tubing connected together by suitable couplings (not shown), and each length of tubing carries a number of conventional drinkers D, whose stems or nipples N are activated by poultry/small animals for watering purposes. Each individual drinker D (FIG. 3) includes an upper housing 11 releasably interlockingly secured to a lower housing 12 which carries the metallic nipple or stem N actuatable by poultry/small animals to move an internal spherical ball or valve (not shown) for dispensing purposes. A passage 14 (FIG. 3) of the upper housing 11 corresponds to the bore 65 and counter bore 62 of the upper housing 17 of Pat. Nos. 4,660,509 and 4,610,221. Accordingly, when the individual drinkers D are to be utilized, activation of any one of the stems N by poultry or small animals unseats the valve (not shown) and water will flow from the water pipe WP through the passage 14 along the nipple N and into the mouth of drinking poultry/small animals or the like.

The water pipe WP is secured to a plurality of brackets or hangers 30 which can be adjusted in height, as is fully explained in Pat. No. 4,669,422.

The brackets 30 also have secured thereto a one inch diameter galvanized pipe or stabilizing element SE. Immediately above the stabilizing element SE there is an anti-roosting element or wire AR which also spans and is connected to the brackets 30. The elements WP, SE, and AR are disposed in generally spaced parallel relationship to each other, as is readily apparent from FIG. 1, and all are vertically adjusted suspension by adjustable suspension clips 13 connected to the brackets 30 which are in turn suspended by conventional suspension means or ropes S. To this point the watering system 10 is conventional.

In accordance with this invention, there is provided a non-obvious watering system 40 which can be utilized independently but is preferably an adjunct to and an improvement over the conventional watering system 10. The watering system 40 is designed primarily to allow young chicks which have been recently de-beaked to drink therefrom. If chicks are not immediately de-beaked, generally before reaching five to ten days old, they will peck each other to death. The beaks are cut off by an electric arc which leaves the beaks tender and, therefore, the chicks can not operate conventional nipples or pins N of conventional drinkers D. Accordingly, as was heretofore noted, chicks up to ten days old which have been de-beaked preferably drink from a trough.

Heretofore, it has been typical in the poultry business to place a number of troughs together in a poultry house, water de-beaked chicks therefrom for up to ten days or so, remove the troughs, and then install or lower pre-existing conventional watering systems, corresponding to the watering system 10. Such conventional troughs could themselves be individually suspended or suspended in groups, and when used the troughs would be lowered and when not in use, the troughs would be elevated. However, as was heretofore noted, when elevated the troughs are subject to damage and abuse because as the chicks grow larger and become feathered, they fly, roost upon, and defecate in such conventional troughs. The problems of the latter have been earlier noted, and the watering system 40 not only prevents such problems but reduces chick/poultry mortality in the absence of redundant or duplicate watering systems.

Figure 4:
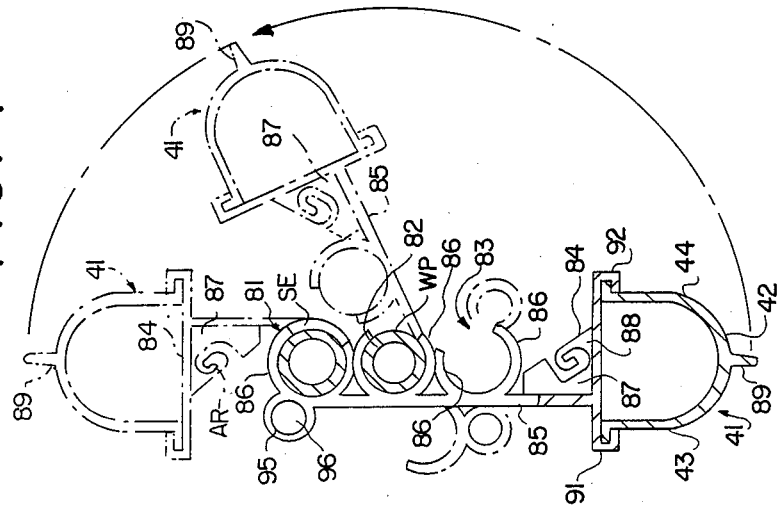
FIG. 4 is a sectional view taken generally along line 4—4 of FIG. 3, and illustrates in solid lines the in-use position of the trough and in phantom outlines in an intermediate position of the trough and the inverted non-use position of the trough.
Figure 15:
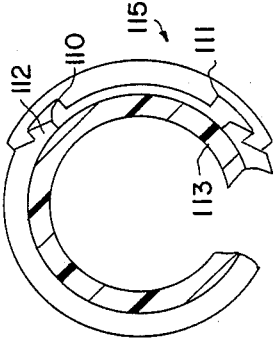
FIG. 15 which appears on the sheet of drawings containing

The watering system 40 includes one or more identical troughs 41, each having a generally curved bottom wall 42 having an anti-roosting rib 89 (FIGS. 2, 4 and 6), opposite side walls 43, 44, and opposite outwardly directed flanges or edges 45, 46 collectively defining a generally elongated mouth M which in the in-use position of each trough 40 (FIGS. 1 and 3) opens generally vertically upwardly toward and beneath the watering pipe WP, as is also illustrated in solid lines in FIG. 4. The flanges 45, 46 project a greater distance beyond the side walls 43, 44 respectively, at the ends of the trough then along a center portion thereof, as is best illustrated in FIG. 5, to permit material to be removed to form respective recesses 51, 52 and 53, 54 arranged in oppositely opening pairs for a purpose to be described more fully hereinafter. The left-hand end, as viewed in FIG. 5 of each trough 41 is closed by an end wall 55, while an opposite end is closed by an end wall 56 having an opening 57 within which is forced-fit or threaded a fluid coupling or tube 58. Another end wall 60 (FIGS. 5, 8, and 10) is spaced from the end wall 56 and defines therewith a float chamber 61 in which is pivotally mounted at 62 a conventional float 63 carrying a resilient seat 64 which in one position will close fluid flow through the fluid coupling 58 (FIG. 3) and in another position (FIG. 8) will permit fluid to flow though the fluid coupling into the float chamber 61 and through generally parallel slots 65 in the wall 60 in the trough 41 filling the same to a predetermined level L (FIG. 3) at which time the float 63 closes the flow of liquid through the fluid coupling 58. The float chamber 61 is also preferably provided with a float chamber cover 70 (FIGS. 5 and 8) formed by a top wall 71, opposite flanges 72, 73 which open in opposed relationship to each other, and a depending baffle plate 74 (FIGS. 6 and 8) which is kept in slight spaced relationship to the float chamber end wall 60 (FIG. 8) and in opposing relationship to the pair of slots 65 by a pair of abutments 79 (FIG. 5). Water, therefore, flows from the flow chamber 61 through the slots 60 and between the end wall 60 and the baffle plate 74 into the trough until the level L. The narrow and long configuration of the slots 65 and the narrow gap between end wall 60 and the baffle plate 74 collectively define a relatively large cross-sectional area of water flow, as opposed to a relatively small circular opening which might, for example, be used in the end wall 60 in lieu of the slots 65, thus assuring that debris falling into the trough 41 will not prevent water from flowing from the float chamber 61 into the trough 41. Furthermore, any tendency of material within the trough 41 backflowing into the float chamber 61 is materially reduced and, of course, it would take a considerable amount of material to close the liquid flow path heretofore defined by the slots 65 and the gap between the end wall 60 and baffle plate 74.

The float chamber cover 70 is removably secured atop the float chamber 61 to close the same, as best shown in FIG. 8, by first positioning the float chamber cover 70 above and generally centrally of the trough 41 and moving the float chamber cover 70 downwardly until the top wall 71 rests upon the upper surfaces (unnumbered) of the flanges 45, 46 in the narrower areas thereof. The distance between the flanges 45, 46 is appreciably less than the maximum interior distance between the U-shaped flanges 72, 73, and the latter distance corresponds generally to the distance between the flanges 45, 46 at the ends of the trough 41. Thus, because of the latter dimensional relationship, the float chamber cover 70 can simply be slid from left-to-right, as viewed in FIG. 5 until the pair of abutments 79 of the baffle plate 74 abut the end wall 60.

Each of the troughs 41 is normally suspended in its in-use position (FIGS. 1 and 3 and solid lines in FIG. 4) by identical suspension or suspending means in the form of at least two identical clamps or brackets 80 releasably secured at opposite ends of each of the troughs 41. Each clamp 80 is formed of injection molded polymeric or copolymeric plastic material, such as polyethylene, and includes a main suspension element or portion 85 including first means 81 for locking each clamp to the stabilizing element SE when the trough 41 is in its in-use position (FIGS. 1 and 3 and solid lines in FIG. 4); means 82 for suspending each clamp 80 from the water pipe WP and doing so in a rotatable fashion, as will be described more fully hereinafter; second locking means 83 for releasably securing each clamp 80 to the stabilizing element SE when the trough 41 is in its non-use inverted position (FIG. 2); and third locking means 84 for additionally locking or securing each clamp 80 to the antiroosting element AR when the trough 41 is in its non-use inverted position (uppermost phantom outline position of FIG. 4 and phantom outline position of FIG. 3). Each of the means 81, 82 and 83 is a generally C-shaped clip defined by opposing curved legs or arms 86, 86 which are sufficiently resilient to spread when snapped upon or removed from the associated elements SE and WP. The locking means 84 (FIGS. 4 and 6) is a generally G-shaped slot formed in a plate portion 87 normal to and bridging the main suspension portion 85 and a base plate or wall 88 having flanges 91, 92 (FIGS. 4 and 6) spaced from each other to slidably receive the wider or longer portions of the flanges 45, 46 of the trough 41 at the opposite ends of the latter. Bight walls 93 (FIG. 7) of each of the flanges 91, 92 has a locking projection 94 (FIG. 7) and the locking projections 94 of the flanges 91, 92 project toward each other. The projections 94 correspond in configuration to the recesses 51 through 54. In order to releasably lock each clamp or bracket 80 to opposite ends of an associated one of the troughs 41, the flanges 91, 92 are simply slid upon the flanges 45, 46 at the longer portions of the latter, as diagrammatically indicated by the unnumbered headed arrows in FIG. 5, until the projections 94 seat in the associated recesses 51 through 54. When thus locked in position, a pair of the clamps 80 associated with each trough 41 affords sufficient rigidity and stability to suspendingly support the trough 41 and the liquid/water therein (FIGS. 1, 3 and 4).

Each clamp 80 also includes a generally cylindrical housing 95 having a cylindrical blind bore 96 (FIGS. 4 and 5). A fluid coupling 97 (FIG. 5) identical to the fluid coupling 58 (FIG. 8) having a stem 98 is retained in the housing 95 with the stem 98 friction-fit in the cylindrical housing 96 when the trough 41 is in its non-use position. The diameter of the stem 98 and the larger diameter of an adjacent cylindrical shoulder 99 of the fluid coupling 97 are sized to friction-fit within bored and counterbored portions (unnumbered) of the passage 14 of the upper housing 11 (FIG. 3) after the lower housing 12, the stem N and the ball (not shown) have been removed therefrom in the manner fully disclosed in Pat. No. 4,660,509, and incorporated hereat by reference. Accordingly, when it is desired to conduct liquid water into the trough 41, a workman simply removes the lower drinker housing 12 of one of the drinkers D, removes the fluid coupling 97 from its "stored" position in the cylindrical housing or bore 96, pushes the stem 98 and the cylindrical portion 99 into the passage 14, as shown by the right-handmost upper housing 11 of the drinker D in FIG. 3, and connects a flexible plastic or rubber pipe P between the fluid couplings 58, 97. The stem 98 and the cylindrical portion 99 are thereby force-fit or friction-fit into the corresponding respective bores 65, 62 of Pat. No. 4,660,509, and when the main valve (not shown) of the water pipe WP is open, water will flow from the water pipe WP through the pipe P and into the trough 41 of FIG. 3 in an apparent manner. FIG. 3 and, of course, the solid line position of FIG. 4 depicts the trough 41 in its in-use position at which time the legs 85, 86 of the locking means 81 lock each of the clamps 80 to the stabilizing element SE and assure that the liquid level L is maintained generally horizontal. In the position shown in FIGS. 1 and 3, the troughs 41 are positioned relatively low to the ground to permit de-beaked chicks to drink directly from the open mouth M of each trough 41, and as the chicks grow, the entire watering system 10 is lifted through the suspension means S. Obviously, as the beaks of the de-beaked chicks "heal," some will heal more quickly than others, and those which have healed sufficiently can, of course, obtain water from the drinkers D which remain accessible to the chicks in areas where there are no troughs, as the leftmost drinkers D in FIG. 1, or even those drinkers D which are positioned immediately above the trough 41, as shown in FIG. 3.

At such time as the beaks of the de-beaked chicks/birds have healed and/or it is desired to use only the drinkers D, the main water supply to the water pipe WP is temporarily cut-off, each fluid coupling 97 with the pipe P still attached thereto is removed from the upper housing 11 of the associated drinker D, and the stem 98 is inserted into the blind bore 97. Alternately, the pipe P can be removed from either or both of the fluid couplings 58, 97, and in the latter case though the fluid coupling 97 is still "stored" with the stem 98 in the blind bore 96, the pipe P can simply be stored elsewhere. The lower drinker housing 12, the nipple 13 and the ball valve (not shown) is, of course, reassembled to the upper housing 11 of the associated drinker from which the fluid coupling(s) 97 have been removed.

Thereafter the brackets 80 associated with each trough 41 are rotated counterclockwise about the axis of the water pipe WP in the manner indicated by the unnumbered headed arrows in FIG. 4. In order to accomplish this rotation the legs 86, 86 of the locking means or C-clamp 81 are temporarily spread to remove the locking means 81 from the stabilizing element SE. Thereafter, each clamp 80 freely rotates about the water pipe WP about the axis of the suspension means 82 eventually pivoting or rotating the associated trough 41 to its uppermost, inverted, non-use position shown in solid lines in FIG. 2 and in the uppermost phantom outline positions of FIGS. 3 and 4. An intermediate position of the clamp 80 is shown in FIG. 4, at approximately two o'clock, and it will be seen therefrom that the legs 86, 86 of the locking means 83 progressively move along an arc toward and in alignment with the stabilizing element SE. The legs 86, 86 of the locking means 83 progressively spread around the stabilizing element SE and eventually snap-secure thereto in embracing relationship, as illustrated in FIG. 2 and in the uppermost phantom outline position of FIG. 4, thus securely locking each trough 41 and its associated clamps or brackets 80 in the non-use position in which the mouth M of each trough 41 generally faces downwardly. In this position should birds roost atop the trough 41 their defecations or other materials will not enter the troughs 41 and, thus, the cleaning for subsequent use is unnecessary. Such anti-roosting is, of course, rendered difficult by, if desired, the provision of the anti-roosting rib 89 heretofore noted. Additionally, the anti-roosting element AR is flexed and inserted into the G-shaped slot 84 (FIG. 4) to additionally lock or augment the locking of each of the clamps 80 in the uppermost phantom outline non-use position of FIGS. 2, 3 and 4. When so positioned, all of the individual drinkers D are readily accessible to the birds, poultry or like animals, as is most apparent from FIG. 2. Obviously, one need but now open the valve to the watering pipe WP and the individual drinkers D can be utilized in a conventional fashion.

Obviously, the troughs are repositioned for the next brood of de-beaked chicks to the in-use position by simply pivoting the clamps 80 associated with each trough 41 from the non-use position (uppermost phantom outline in FIG. 4) clockwise, as viewed in FIG. 4, to the solid outline position of the troughs 41 in FIGS. 1, 3 and 4, cutting-off the water supply to the water pipe WP, removing the fluid couplings 97 from the cylindrical blind bores 96, and assembling the fluid couplings 97 and the pipe P in the manner heretofore described and graphically illustrated at the right-hand side of FIG. 3.

Reference is now made to FIGS. 9 through 15 of the drawings which illustrate another trough 41' which includes identical elements as those corresponding to the trough 41 which bear like though primed reference numerals. However, the trough 41' includes a longitudinal central divider 101 which extends along the trough 41' between a float chamber end wall 60' and a wall 102 (FIG. 9) opposite thereto. The longitudinal central divider or wall 101 thereby divides the trough 41' into two trough sections 103, 104 (FIG. 9) into which water/liquid is fed through slots 65'. In this case upper edges (unnumbered) of the walls 43' 44' of the float chamber 61' are elevated slightly above or somewhat higher than the upper edges (unnumbered) of the trough sections 103, 104, as is readily apparent from FIGS. 10 and 12. However, the float chamber 61' is closed by a float chamber cover 70' having a bifurcated baffle plate 105 (FIGS. 11 and 13) defined by baffle plate portions 106, 107 defining a slot 108 therebetween which straddles the central divider or wall 101, as is most apparent from FIG. 13.

Reference is made to FIG. 14 which includes a modified clamp or bracket 80' which differs from the clamp or bracket 80 heretofore described in three particulars, namely, an additional housing 95' having a blind cylindrical bore 96' is provided for a "spare" fluid coupling; a plate portion 87' is provided with a straight slot 84' for receiving the anti-roosting element AR in the inverted non-use position of the clamp 80' and an associated trough; and legs or arms 86', 86' (FIGS. 14 and 15) of the clamping means 82' are provided with grooves or notches 110, 111, respectively, which receives detents 112, 113, respectively, of locking or retaining means 115 in the form of an arcuate plastic band or clip which with the legs 86', 86' completely encircles the water pipe WP in the in-use position of the clamp 80' and the associated trough 41' to assure that no matter what abuse the poultry/animals may cause, the locking means 82' will not inadvertently snap from the water pipe WP.

Although a preferred embodiment of the invention has been specifically illustrated and described herein, it is to be understood that minor variations may be made in the apparatus without departing from the spirit and scope of the invention, as defined in the appended claims.

I claim:

1. A drinking mechanism comprising a trough, said trough having a generally upwardly opening mouth when said trough is in an in-use position, means for suspending said trough from a support structure in said in-use position, said trough being movable to a non-use position at which said mouth is in a generally downardly opening position, first locking means for releasably locking said trough in said non-use position, and drinker means for delivering water in a generally downward direction when said trough is in said non-use position.

2. The drinking mechanism as defined in claim 1 wherein said suspending means includes a clip.

3. The drinking mechanism as defined in claim 1 wherein said suspending means includes means for effecting rotary motion of said trough between said in-use and non-use positions.

4. The drinking mechanism as defined in claim 1 including second locking means for releasably locking said trough in said in-use position.

5. The drinking mechanism as defined in claim 1 including second locking means for releasably locking said trough in said in-use position, and said second releasably locking means includes a clip.

6. The drinking mechanism as defined in claim 1 including anti-roosting means defining a portion of said trough for preventing poultry from roosting upon said trough in the non-use position thereof.

7. The drinking mechanism as defined in claim 1 including means for releasably connecting said trough and said suspending means.

8. The drinking mechanism as defined in claim 1 including means for slidably releasably connecting said trough and said suspending means.

9. The drinking mechanism as defined in claim 1 wherein said first locking means includes individual second and third releasable locking means for releasably locking said trough in said non-use position.

10. The drinking mechanism as defined in claim 1 including second locking means for releasably locking said trough in said in-use position, and said first releasable locking means includes second and third releasable locking means for releasably locking said trough in said non-use position.

11. The drinking mechanism as defined in claim 1 including second releasable locking means for releasably locking said trough in said in-use position, and one of said first-mentioned and second releasable locking means includes a clip.

12. The drinking mechanism as defined in claim 1 including second releasable locking means for releasably locking said trough in said in-use position, and one of said first-mentioned and second releasable locking means includes a slot.

13. The drinking mechanism as defined in claim 1 including second locking means for releasably locking said trough in said in-use position, and both of said first-mentioned and second releasable locking means is a clip.

14. The drinking mechanism as defined in claim 1 including second locking means for locking said trough in said in-use position, one of said first-mentioned and second releasable locking means includes a clip, and another of said first-mentioned and second releasable locking means includes a slot.

15. The drinking mechanism as defined in claim 1 including second locking means for releasably locking said trough in said in-use position, one of said first-mentioned and second releasable locking means includes a generally C-shaped clip, and another of said first-mentioned and second releasable locking means includes a slot.

16. The drinking mechanism as defined in claim 1 including second locking means for releasably locking said trough in said in-use position, said first releasable locking means include individual third and fourth releasable locking means for releasably locking said trough in said non-use position, and one of said, second, third and fourth releasable locking means includes a clip.

17. The drinking mechanism as defined in claim 1 including second locking means for releasably locking said trough in said in-use position, said first releasable locking means including individual third and fourth releasable locking means for releasably locking said trough in said non-use position, and one of said second, third and fourth releasable locking means includes a slot.

18. The drinking mechanism as defined in claim 1 including second locking means for releasably locking said trough in said in-use position, said first releasable locking means including individual third and fourth releasable locking means for releasably locking said trough in said non-use position, and two of said second, third, and fourth releasable locking means are clips.

19. The drinking mechanism as defined in claim 1 including second locking means for releasably locking said trough in said in-use position, said first releasable locking means including individual third and fourth releasable locking means for releasably locking said trough in said non-use position, one of said second, third and fourth releasable locking means includes a clip, and another of said second, third and fourth releasable locking means includes a slot.

20. The drinking mechanism as defined in claim 1 including second locking means for locking said trough in said in-use position, said first releasable locking means including individual third and fourth releasable locking means for releasably locking said trough in said non-use position, one of said second, third and fourth releasable locking means includes a generally C-shaped clip, and another of said second, third and fourth releasable locking means includes a slot.

21. A drinking system comprising a water pipe carrying a plurality of individual drinkers, means for supporting said water pipe generally horizontally, a drinking mechanism including a trough, said trough having a mouth disposed beneath and opening generally upwardly toward said water pipe when said trough is in its in-use position, means for suspending said trough in said in-use position, said trough being movable to a non-use position at which said mouth is in a generally downwardly opening position, first locking means for releasably locking said trough in said non-use position, and drinker means positioned for delivering water in a generally downward direction when said trough is in its non-use position.

22. The drinking system as defined in claim 21 wherein said suspending means includes means for effecting rotary motion of said trough between said in-use and non-use positions.

23. The drinking system as defined in claim 21 wherein said suspending means includes means for effecting rotary motion of said trough about the axis of said water pipe between said in-use and non-use positions.

24. The drinking system as defined in claim 23 including a stabilizing element positioned along said water pipe, and said maintaining means include means for locking said trough to said stabilizing element in said non-use position.

25. The drinking system as defined in claim 24 wherein said first locking means includes a generally C-shaped clip.

26. The drinking system as defined in claim 23 including a stabilizing element positioned along said water pipe, and said first locking means includes means for releasably locking said trough to said stabilizing element in said in-use position.

27. The drinking system as defined in claim 26 wherein said first locking means includes a generally C-shaped clip.

28. The drinking system as defined in claim 23 including an anti-roosting element positioned above and along said water pipe, and said first locking means include means for releasably locking said trough to said anti-roost element in said non-use position.

29. The drinking system as defined in claim 28 wherein said first locking means includes a slot.

30. The drinking system as defined in claim 23 including a stabilizing element positioned along said water pipe and an anti-roosting element positioned above and along said water pipe, said first locking means include means for releasably locking said trough to said stabilizing element in said non-use position, second locking means for releasably locking said trough to said stabilizing element in said in-use position, and third locking means for releasably locking said trough to said anti-roosting element in said non-use position.

31. The drinking system as defined in claim 31 wherein one of said first, second and third locking means includes a generally C-shaped clip and another of said first, second and third locking means includes a slot.

32. The drinking system as defined in claim 21 including a stabilizing element positioned along said water pipe, and said first locking means include means for locking said trough to said stabilizing element in said non-use position.

33. The drinking system as defined in claim 32 wherein said first locking means includes a generally C-shaped clip.

34. The drinking system as defined in claim 21 including a stabilizing element positioned along said water pipe, and second locking means for releasably locking said trough to said stabilizing element in said in-use position.

35. The drinking system as defined in claim 34 wherein said second locking means includes a generally C-shaped clip.

36. The drinking system as defined in claim 21 including an anti-roosting element positioned above and along said water pipe, and said first locking means include means for releasably locking said trough to said anti-roost element in said non-use position.

37. The drinking system as defined in claim 36 wherein said first locking means includes a slot.

38. The drinking system as defined in claim 21 including a stabilizing element positioned along said water pipe and an anti-roosting element positioned above and along said water pipe, said first locking means include means for releasably locking said trough to said stabilizing element in said non-use position, second locking means for releasably locking said trough to said stabilizing element in said in-use position, and third locking means for releasably locking said trough to said anti-roosting element in said non-use position.

39. The drinking system as defined in claim 27 wherein one of said first, second and third locking means includes a generally C-shaped clip and another of said first, second and third locking means includes a slot.

* * * * *